(12) United States Patent
Ji et al.

(10) Patent No.: US 11,170,144 B2
(45) Date of Patent: Nov. 9, 2021

(54) MODELING METHOD FOR HIGH-DENSITY DISCRETE PARTICLE MULTIPHASE SYSTEM

(71) Applicant: SHANDONG UNIVERSITY, Shandong (CN)

(72) Inventors: Zhong Ji, Shandong (CN); Ren Liu, Shandong (CN); Jizhi Zhang, Shandong (CN); Peiyao Sheng, Shandong (CN); Fangkun Zou, Shandong (CN)

(73) Assignee: SHANDONG UNIVERSITY, Jinan (CN)

( * ) Notice: Subject to any disclaimer, the term of this patent is extended or adjusted under 35 U.S.C. 154(b) by 391 days.

(21) Appl. No.: 16/314,502

(22) PCT Filed: Oct. 19, 2017

(86) PCT No.: PCT/CN2017/106883
§ 371 (c)(1),
(2) Date: Dec. 31, 2018

(87) PCT Pub. No.: WO2019/010859
PCT Pub. Date: Jan. 17, 2019

(65) Prior Publication Data
US 2019/0332733 A1    Oct. 31, 2019

(30) Foreign Application Priority Data

Jul. 13, 2017   (CN) .......................... 2017105709501

(51) Int. Cl.
*G06F 30/23*       (2020.01)
*G06F 111/10*      (2020.01)

(52) U.S. Cl.
CPC .......... *G06F 30/23* (2020.01); *G06F 2111/10* (2020.01)

(58) Field of Classification Search
CPC ............................ G06F 30/23; G06F 2111/10
(Continued)

(56) References Cited

U.S. PATENT DOCUMENTS

| 8,315,821 | B2  | 11/2012 | Brujic et al. |
| 8,554,527 | B2* | 10/2013 | Nishiura ................ G06F 30/20 703/7 |

(Continued)

FOREIGN PATENT DOCUMENTS

| CN | 104899393 A | 9/2015 |
| CN | 105740532 A | 7/2016 |

(Continued)

OTHER PUBLICATIONS

Yaghoobi et al. (Mesoscale Fracture Analysis of Multiphase Cementitious Composites Using Peridynamics, MDPI, 2017, pp. 1-21) (Year: 2017).*

(Continued)

*Primary Examiner* — Iftekhar A Khan
(74) *Attorney, Agent, or Firm* — Oliff PLC

(57) ABSTRACT

A modeling method for a high-density discrete particle multiphase system, including the following steps: determining a model boundary; drawing up a volume sum of particle phases within each size range in the model; generating compact models of particle models within all size ranges; expanding the particles in the compact models; and obtaining a high-density particle accumulation model. The method can be used for modeling of meso-structures of particle reinforced composite materials, granular materials in soft matter, particle accumulation materials and the like, and can also be extended to short fiber reinforced composite materials and the like. The method solves the modeling problem when the particles intersect with the model boundary, and (Continued)

can be applied to the modeling and analysis of composite specimens with machined surfaces.

9 Claims, 1 Drawing Sheet

(58) Field of Classification Search
USPC .......................................................... 703/2
See application file for complete search history.

(56) References Cited

U.S. PATENT DOCUMENTS

| | | | |
|---|---|---|---|
| 8,560,286 B2 | 10/2013 | Favier | |
| 8,798,341 B2* | 8/2014 | Baudry | G01N 15/1475 382/128 |
| 9,472,020 B2 | 10/2016 | Favier | |
| 9,792,391 B2* | 10/2017 | Nalluri | G06F 30/00 |
| 9,861,569 B2* | 1/2018 | Brujic | A61K 8/0241 |
| 2005/0066301 A1* | 3/2005 | Lorenz | G06F 30/23 716/102 |
| 2005/0094141 A1* | 5/2005 | Zechner | G06F 30/23 356/338 |
| 2005/0131662 A1* | 6/2005 | Ascenzi | B33Y 50/00 703/11 |
| 2007/0165948 A1* | 7/2007 | Laffargue | G06T 17/20 382/173 |
| 2008/0099569 A1* | 5/2008 | Plumpton | B29C 45/78 236/1 B |
| 2008/0215166 A1* | 9/2008 | Blessing | A61F 13/15804 700/31 |
| 2009/0132218 A1* | 5/2009 | Ledgerwood, III | E21B 10/55 703/7 |
| 2009/0266891 A1* | 10/2009 | Santucci | G06Q 50/28 235/385 |
| 2010/0030534 A1* | 2/2010 | Reich | G06F 30/20 703/2 |
| 2010/0042383 A1* | 2/2010 | Shi | G01N 3/303 703/2 |
| 2010/0042386 A1* | 2/2010 | Milne | G06F 30/23 703/6 |
| 2010/0169062 A1* | 7/2010 | Linn | G06F 30/20 703/2 |
| 2010/0211330 A1* | 8/2010 | Brujic | G01N 15/02 702/30 |
| 2010/0262406 A1* | 10/2010 | Goel | G06F 30/23 703/2 |
| 2010/0305916 A1* | 12/2010 | Takahashi | G01W 1/10 703/2 |
| 2011/0032255 A1* | 2/2011 | Favier | G06T 13/20 345/420 |
| 2011/0106507 A1* | 5/2011 | Lepage | G01V 11/00 703/2 |
| 2011/0295563 A1* | 12/2011 | McDaniel | G06F 30/20 703/1 |
| 2012/0253756 A1* | 10/2012 | Favier | G06T 17/00 703/2 |
| 2013/0289957 A1* | 10/2013 | Han | G16C 10/00 703/6 |
| 2014/0039858 A1* | 2/2014 | Favier | G06T 17/00 703/6 |
| 2014/0278292 A1* | 9/2014 | Grellou | G06F 30/15 703/2 |
| 2015/0112651 A1* | 4/2015 | Han | G06F 30/20 703/2 |
| 2020/0089826 A1* | 3/2020 | Liu | B33Y 50/00 |

FOREIGN PATENT DOCUMENTS

| | | |
|---|---|---|
| CN | 106777807 A | 5/2017 |
| EP | 2509009 A1 | 10/2012 |
| JP | 2006-259910 A | 9/2006 |
| WO | 2012/131372 A1 | 10/2012 |

OTHER PUBLICATIONS

Wriggers et al. ("Micro-Meso-Macro Modelling of Composite Materials". COMPLAS 2005, pp. 1-19) (Year: 2005).*

Carmona et al. (From fracture to fragmentation: discrete element modeling—Complexity of crackling noise and fragmentation phenomena revealed by discrete element simulations, 2015, arXiv:1509.01003v1, pp. 1-18) (Year: 2015).*

Pirker et al. ("Improving the applicability of discrete phase simulations bysmoothening their exchange fields", Elsevier Inc., 2010, pp. 2479-2488) (Year: 2010).*

Apr. 16, 2018 International Search Report issued in International Patent Application No. PCT/CN2017/106883.

Apr. 16, 2018 Written Opinion of the International Searching Authority issued in International Patent Application No. PCT/CN2017/106883.

* cited by examiner

MODELING METHOD FOR HIGH-DENSITY DISCRETE PARTICLE MULTIPHASE SYSTEM

FIELD OF THE INVENTION

The present invention belongs to the field of computational materials science, specifically relates to a meso-scale modeling method for a meso-structure of a high-density discrete particle multiphase system, and particularly relates to a modeling method for a meso-structure of a particle reinforced composite material, a granular material in soft matter, a particle accumulation material or the like, which can also be extended to a short fiber reinforced composite material.

BACKGROUND OF THE INVENTION

In particle reinforced composite materials and soft matter systems composed of particles such as concrete and debris flow, the properties of the materials, such as mechanical properties and transport properties, are heavily dependent on the meso-structures of the materials. Therefore, multi-scale modeling on the structures of such materials is of great significance for the performance analysis of the materials and the optimization of the material structures.

As complex multi-scale discrete media, granular materials can be considered as random accumulation structures composed of particles of different scales. The voids between the particles are usually filled with media such as matrix materials, interfaces, pores, or fluid. To correctly describe the performance of a discrete particle multiphase system, the multi-scale structure of the system, especially the accumulation structure of the particles, should be correctly described first.

For randomly accumulated particles, the main modeling methods currently used include a random placement method, a Voronoi method, etc. The random placement method, also known as the Monte Carlo method, assigns the positions of particles one by one within given time and space in a certain order. Once the assignment is successful, the placement is successful and the particles are fixed at the assigned positions. The Monte Carlo method is highly efficient, but the packing density of the particles is very low. The later the placement is, the smaller the selection space of random points is, the more difficult the placement is, so that it is difficult to place all the particles into the limited model space. A material with a certain structure often exists in the engineering practice, but its meso-scale structural model cannot be generated. Although the Voronoi method can easily generate densely distributed random particles, it cannot control the grading of the particles, that is, cannot control the volume ratio or weight ratio of the particles of different particle sizes. In addition, the Voronoi method is mainly suitable for convex particles, not suitable for concave particles, or both convex and concave particles.

Chinese Patent Document 201510345395.3 discloses a modeling method for a meso-structure of a discrete phase reinforced composite material, in which randomly distributed particles are generated in a large space, then the surface of the particles is divided into shell elements, the free fall motion of the particles to a small space is simulated, and a high-density particle stacking structure is thus generated. The method can solve the problems that the packing density of the particles is insufficient in the methods of random placement, and the problems that the Voronoi method cannot be used for concave particles and cannot control the grading of particles, but the upper surface of the accumulation body may not be flat after falling, the calculation of the falling process is also time-consuming, and the calculation cost is high due to two times of meshing of shell and solid elements. In addition, this method is very effective when all particles are inside a particular space, but special treatment is required when the particles intersect with the model boundary.

SUMMARY OF THE INVENTION

In view of the shortcomings in the prior art, the objective of the present invention is to provide a modeling method for a high-density discrete particle multiphase system. The method can be used for high-density meso-structure modeling on particle reinforced composite materials, granular materials in soft matter, particle accumulation materials, short fiber reinforced composite materials, etc. The method has the advantages of the invention described in Chinese Patent Document 201510345395.3, and has the characteristics of simplicity, wide adaptability, high calculation efficiency and the like.

In order to achieve the above objective, the technical solution of the present invention is as follows:

A modeling method for a high-density discrete particle multiphase system, comprising the following steps:

(1) drawing up the contour shape and size of a model, that is, determining a modeling space and a boundary thereof;

(2) drawing up the volume sum of particles within each size range according to a predetermined grading, that is, setting the volume sum of particle phases within a size range of i to j to be $V_{(i-j)}$;

(3) randomly obtaining a plurality of particle models within a size range of $i \times \alpha$ to $j \times \alpha$ in the modeling space, wherein $\alpha < 1$, the volume sum of the particle models is $V_{(i-j)} \times \beta$, each particle does not interfere with the surrounding particles, and a compact model of each particle within the size range of i to j is obtained;

(4) repeating step (3) to generate compact models of particles within all size ranges; and (5) expanding the volume of the compact model of each particle in step (4) in the modeling space of step (1), that is, expanding the size of the compact model of each particle by $1/\alpha$ times, and expanding the volume by $1/\beta$ times too, thereby expanding the compact model of each particle to a normal-sized model conforming to the predetermined grading in step (2), where the obtained particle distribution model is the desired high-density particle structure model.

Compared with the prior art, the technical solution of the present invention has the following beneficial technical effects:

(1) Since each particle is generated at a random point, the uniformity of spatial distribution of the particles can be ensured.

(2) Since the compact model of each particle is generated first, it is easy to find a random point to place the next particle, and solves the problem that the existing random placement method hardly find or fundamentally cannot find a random point to place the next particle in the given time.

(3) The compact models of the particles in various shapes can be generated according to the predetermined grading, thereby solving the problem that the Voronoi method cannot be used for concave particles and cannot control the grading of the particles.

(4) The method solves the modeling problem when the particles intersect with the model boundary, and can be applied to the modeling and analysis of composite specimens having the machined surface.

(5) The particle packing density consistent with the real material can be obtained by expanding the compact models, and the problem that a high-density model cannot be obtained by the methods of random placement and the like is solved.

BRIEF DESCRIPTION OF THE DRAWINGS

The accompanying drawings constituting a part of the present invention are used for further understanding the present invention, and the schematic embodiments of the present invention and the description thereof are used for interpreting the present invention, rather than constituting improper limitation to the present invention.

REFERENCE SIGNS

Figure 1:
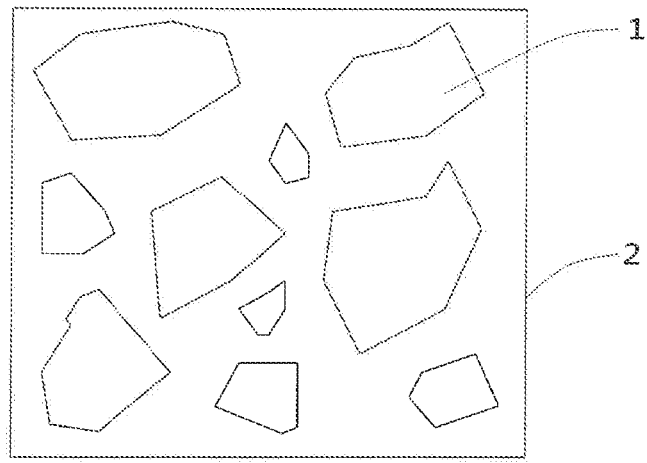
FIG. 1 is a schematic diagram of a compact model of each particle randomly generated in a modeling space.
Figure 2:
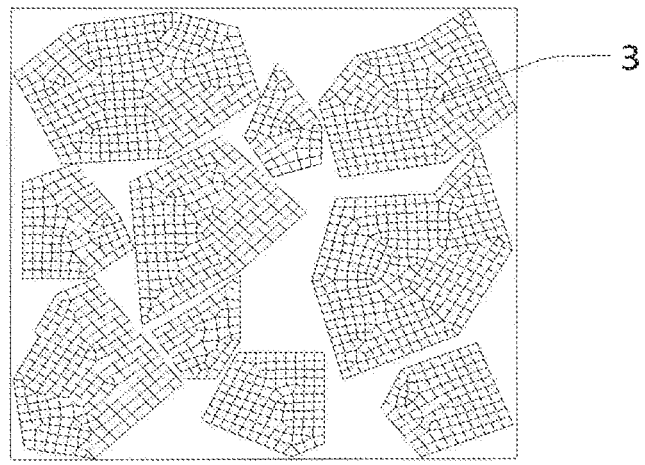
FIG. 2 is a finite element mesh diagram of a high-density model obtained by expanding and redistributing each particle in the compact model.

1—compact particle model, 2—model boundary, 3—finite element mesh of normal-sized particles obtained after expansion, 4—expanded normal-sized particle model.

DETAILED DESCRIPTION OF EMBODIMENTS

It should be pointed out that the following detailed descriptions are all exemplary and aim to further illustrate the present invention. Unless otherwise specified, all technical and scientific terms used in the descriptions have the same meanings generally understood by those of ordinary skill in the art of the present invention.

It should be noted that the terms used herein are merely for describing specific embodiments, but are not intended to limit exemplary embodiments according to the present invention. As used herein, unless otherwise explicitly pointed out by the context, the singular form is also intended to include the plural form. In addition, it should also be understood that when the terms "include" and/or "comprise" are used in the specification, they indicate features, steps, operations and/or their combination.

As described in the background, the prior art has certain shortcomings in modeling methods for randomly accumulated particles. In order to solve the above technical problems, the present invention proposes a modeling method for a high-density discrete particle multiphase system, including the following steps:

(1) drawing up the contour shape and size of a model, that is, determining a modeling space and a boundary thereof;
(2) drawing up the volume sum of particles within each size range according to a predetermined grading, that is, setting the volume sum of particle phases within a size range of i to j to be $V_{(i-j)}$;
(3) randomly obtaining a plurality of particle models within a size range of $i \times \alpha$ to $j \times \alpha$ (including $i \times \alpha$ and $j \times \alpha$) in the modeling space, wherein $\alpha<1$, the volume sum of the particle models is $V_{(i-j)} \times \beta$, each particle does not interfere with the surrounding particles, and a compact model of each particle within the size range of i to j is obtained;
(4) repeating step (3) to generate compact models of particles within all size ranges; and
(5) expanding the volume of the compact model of each particle in step (4) in the modeling space of step (1), that is, expanding the size of the compact model of each particle by $1/\alpha$ times, and expanding the volume by $1/\beta$ times too, thereby expanding the compact model of each particle to a normal-sized model conforming to the predetermined grading in step (2), where the obtained particle distribution model is the desired high-density particle structure model.

For a particle reinforced composite material or a granular material in soft matter or the like, voids between the particles serve as a second phase, and a multiphase model is thus generated.

In step (5), the method of expanding the compact model of each particle includes the following steps:

a, dividing the boundary (referred to as model boundary) of the modeling space in step (1) into finite element meshes, and assigning material properties to the finite element meshes;

b, dividing the particles in step (4) into finite element meshes, and assigning material properties to the finite element meshes;

c, defining a contact judgment mode between the particles and between the particles and the boundary of the modeling space, so that they do not penetrate each other; and d, applying a temperature or a heat flux load to the particles by a finite element method to cause thermal expansion; after $1/\alpha$ times thermal expansion, the sizes of the particles being changed from $i \times \alpha \sim j \times \alpha$ to $i \sim j$, and the volume sum of the particles also being expanded by $1 \times \beta$ times, from $V_{(i-j)} \times \beta$ to $V_{(i-j)}$.

Preferably, in step a, the model boundary is a temperature-independent rigid material.

Preferably, in step b, the particles are of a thermoelastic material or a thermoplastic material, and further preferably, the particles are of a thermoelastic material.

Preferably, in steps a-b, the particle models are divided into shell or solid elements, and the model boundary is of solid elements or shell elements.

Preferably, in step c, the contact mode is surface-to-surface contact, or node-to-surface contact, or node-to-node contact.

Preferably, in step (3), $\alpha=0.4$-$0.9$, $\beta=\alpha^3$, and it is verified that the selected $\alpha=0.4$-$0.9$ can enable the model to be generated more efficiently.

Preferably, the high-density discrete particle multiphase system is a particle reinforced composite material, a granular material in soft matter (such as asphalt concrete or debris flow), a particle accumulation material or a short fiber reinforced composite material.

Preferably, in steps (1) to (3), the method of obtaining a plurality of particle models within the size range of $i \times \alpha$ to $j \times \alpha$ includes the following steps:

a, randomly generating a point within the modeling space, and generating a sphere having the diameter of $i \times \alpha$ to $j \times \alpha$ by using the point as the center;

b, judging whether the sphere generated in step a interferes with the surrounding particles that have been generated, deleting the generated sphere if the interference occurs, and repeating step a;

c, generating an inscribed polyhedron in the sphere, optionally selecting several vertexes of the polyhedron, and moving the polyhedron along the radius of the sphere to form concave and convex surfaces so as to obtain a particle model that approximates the real particle shape;

d, judging whether the generated particle interferes with the model boundary, and if the interference occurs, deleting the portion of the particle outside the model boundary;

e, calculating the volume of the particle model obtained in step d;
f, repeating steps a~e, and summing the volumes of the obtained particle models to obtain $\Sigma V$; and
g, judging whether $\Sigma V$ reaches $V_{(i\text{-}j)} \times \beta$, and if not, repeating steps a~f.

In step a, the generated model is spherical, ellipsoidal, cuboid, or in other shape similar to a sphere.

If the shapes of the particles can be directly described by a mathematical equation, the particle models are directly generated by the mathematical equation in steps a~c, and step c is omitted.

In step (5), the method of expanding the compact model of each particle may also be the discrete element method or the like.

The application of the above modeling method in the modeling of a two-dimensional meso-structure is characterized in that the volume in the above modeling method is replaced by area, the sphere generated at the random point is replaced by a circle, the inscribed polyhedron is replaced by an inscribed polygon of a circle, and $\beta = \alpha^2$.

The application of the above modeling method in the modeling of a fiber reinforced composite material is characterized in that the sphere generated at the random point in the above modeling method is replaced by a column, and a fiber model is generated from the column.

In order that those skilled in the art can understand the technical solution of the present invention more clearly, the technical solution of the present invention will be described in detail below in combination with specific embodiments and the drawings.

Embodiment 1

Figure 3:
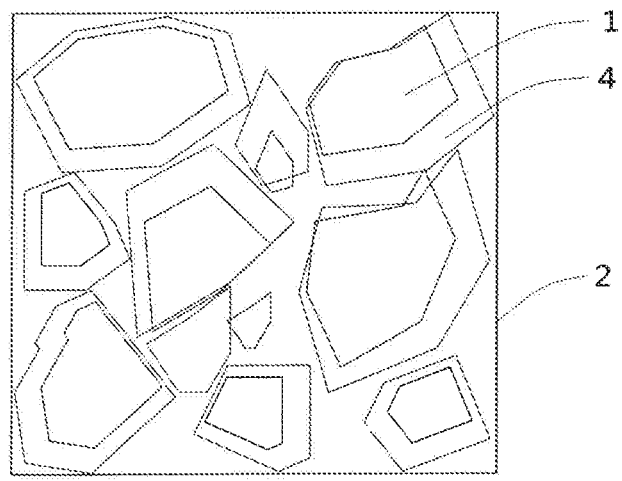
FIG. 3 is a comparison diagram of the compact model and the expanded model.

A modeling method for a high-density two-dimensional discrete particle multiphase system includes the following steps:
(1) drawing up the contour shape and size of a model, that is, determining a modeling space and a boundary thereof, e.g., a model boundary in FIG. 1, where 2 is a model boundary;
(2) generating a compact model of each particle according to a predetermined grading, e.g., a compact model of each particle in FIG. 1, where 1 is a particle compact model;
(3) dividing the compact model of each particle into two-dimensional plane elements, and assigning thermoelastic material properties to the plane elements;
(4) dividing the model boundary into two-dimensional plane elements, and assigning temperature-independent rigid material properties to the two-dimensional plane elements;
(5) defining the contact between the particles and between the particles and the model boundary to be surface-to-surface contact, so that they do not penetrate each other; and
(6) applying a temperature or a heat flux load to the compact model of each particle in step (4) by finite element method within the modeling space drawn up in step (1) to cause thermal expansion, that is, expanding the size of the compact model of each particle by $1/\alpha$ times, and expanding the area by $1/\beta$ times, where $\alpha = 0.4 \sim 0.9$. After $1/\alpha$ times expansion, the sizes of the particles are changed from $i \times \alpha \sim j \times \alpha$ to $i \sim j$, as shown in FIG. 3, which is a comparison diagram of compact models and expanded models, where 1 is a particle compact model, and 4 is an expanded normal-sized particle model. The area sum of the particles also expands $1 \times \beta$ times, from $S_{(i\text{-}j)} \times \beta$ to $S_{(i\text{-}j)}$, thereby expanding the compact model of each particle to a normal-sized model conforming to the predetermined grading in step (2).

The particle distribution model obtained at this time is the desired high-density particle structure model. For a particle reinforced composite material or a granular material in soft matter or the like, voids between the particles serve as a second phase, and a multiphase model is thus generated.

In steps (1) to (2), the method of obtaining a plurality of particle models within the size range of $i \times \alpha$ to $j \times \alpha$ includes the following steps:
a, randomly generating a point within the modeling space, and generating a circle having the diameter of $i \times \alpha$ to $j \times \alpha$ by using the point as the center;
b, judging whether the circle generated in step a interferes with the surrounding particles that have been generated, deleting the generated circle if the interference occurs, and repeating step a;
c, generating an inscribed polyhedron in the circle, optionally selecting several vertexes of the polyhedron, and moving the polyhedron along the radius of the circle to form concave and convex surfaces so as to obtain a particle model that approximates the real particle shape;
d, judging whether the generated particle interferes with the model boundary, and if the interference occurs, deleting the portion of the particle outside the model boundary;
e, calculating the area of the particle model obtained in step d;
f, repeating steps a~e, and summing the areas of the obtained particle models to obtain $\Sigma S$; and
g, judging whether $\Sigma S$ reaches $S_{(i\text{-}j)} \times \beta$, and if not, repeating steps a~f.

Embodiment 2

A modeling method for a three-dimensional meso-structure of a high-density particle reinforced composite material includes the following steps:
(1) drawing up the contour shape and size of a model, that is, determining a modeling space and a boundary thereof;
(2) drawing up the volume sum of particles within each size range according to a predetermined grading, that is, setting the volume sum of particle phases within a size range of i to j to be $V_{(i\text{-}j)}$;
(3) randomly obtaining a plurality of particle models within a size range of $i \times \alpha$ to $j \times \alpha$ in the modeling space, wherein $\alpha = 0.6$, the volume sum of the particle models is $V_{(i\text{-}j)} \times \beta$, each particle does not interfere with the surrounding particles, and a compact model of each particle within the size range of i to j is obtained;
the method of obtaining a plurality of particle models within the size range of $i \times \alpha$ to $j \times \alpha$, including the following steps:
a, randomly generating a point within the modeling space, and generating a sphere having the diameter of $i \times \alpha$ to $j \times \alpha$ by using the point as the center;
b, judging whether the sphere generated in step a interferes with the surrounding particles that have been generated, deleting the generated sphere if the interference occurs, and repeating step a;
c, generating an inscribed polyhedron in the sphere, optionally selecting several vertexes of the polyhedron, and moving the polyhedron along the radius of the sphere to form concave and convex surfaces so as to obtain a particle model that approximates the real particle shape;
d, judging whether the generated particle interferes with the model boundary, and if the interference occurs, deleting the portion of the particle outside the model boundary;
e, calculating the volume of the particle model obtained in step d;

f, repeating steps a~e, and summing the volumes of the obtained particle models to obtain $\Sigma V$; and g, judging whether $\Sigma V$ reaches $V_{(i-j)} \times \beta$, and if not, repeating steps a~f:

(4) repeating step (3) to generate compact models of particles within all size ranges; and (5) expanding the volume of the compact model of each particle in step (4) in the modeling space of step (1), that is, expanding the size of the compact model of each particle by $1/\alpha$ times, and expanding the volume by $1/\beta$ times too, thereby expanding the compact model of each particle to a normal-sized model conforming to the predetermined grading in step (2), where the obtained particle distribution model is the desired high-density particle structure model.

The method of expanding the compact model of each particle specifically includes the following steps:

a, dividing the boundary (referred to as model boundary) of the modeling space in step (1) into finite element meshes, and assigning temperature-independent rigid material properties to the finite element meshes;

b, dividing the particles in step (4) into finite element meshes, and assigning thermoelastic material properties to the finite element meshes;

c, defining the contact between the particles and between the particles and the boundary of the modeling space to be node-to-surface contact, so that they do not penetrate each other; and d, applying a temperature or a heat flux load to the particles by a finite element method to cause thermal expansion; after $1/\alpha$ times thermal expansion, the sizes of the particles being changed from $i \times \alpha \sim j \times \alpha$ to i~j, and the volume sum of the particles also being expanded by $1 \times \beta$ times, from $V_{(i-j)} \times \beta$ to $V_{(i-j)}$.

The particle distribution model obtained at this time is the desired high-density particle structure model. For a particle reinforced composite material or a granular material in soft matter or the like, voids between the particles serve as a second phase, and a multiphase model is thus generated.

Described above are merely preferred embodiments of the present invention, and the present invention is not limited thereto. Various modifications and variations may be made to the present invention for those skilled in the art. Any modification, equivalent substitution or improvement made within the spirit and principle of the present invention shall fall into the protection scope of the present invention.

The invention claimed is:

1. A modeling method for a high-density discrete particle multiphase system, comprising the following steps:
   (1) drawing up a contour shape and a size of a model, the model comprising a modeling space and a model boundary for the model space;
   (2) drawing up a volume sum of particle phases within each size range according to a predetermined grading, by setting the volume sum of particle phases within a size range of i to j to be $V_{(i-j)}$;
   (3) randomly obtaining a plurality of particle models within a size range of $i \times \alpha$ to $j \times \alpha$ in the modeling space, wherein $\alpha < 1$, a volume sum of the particle models is $\Sigma V_{(i-j)} \times \beta$ ($\beta$ being a constant), each particle does not interfere with surrounding particles, and a compact model of each particle within the size range of i to j is obtained;
   (4) repeating step (3) to generate compact models of particles within all size ranges; and
   (5) expanding a volume of each compact model of the particles generated in step (4) in the modeling space of step (1), by expanding the size of each compact model of each particle by $1/\alpha$ times, and expanding the volume by $1/\beta$ times, thereby expanding each compact model of each particle to a normal-sized particle model conforming to the predetermined grading in step (2), where a resulting obtained particle distribution model is a desired high-density particle structure model,
   wherein in steps (1) to (3), the method of randomly obtaining a plurality of particle models within the size range of $i \times \alpha$ to $j \times \alpha$ comprises the following steps:
   a, randomly generating a point within the modeling space, and generating a sphere having a diameter of $i \times \alpha$ to $j \times \alpha$ by using the point as the center;
   b, judging whether the sphere generated in step a interferes with the surrounding particles that have been generated, deleting the generated sphere if the interference occurs, and repeating step a;
   c, generating an inscribed polyhedron in the sphere, optionally selecting several vertexes of the polyhedron, and moving the polyhedron along a radius of the sphere to form concave and convex surfaces so as to obtain a particle model that approximates a real particle shape;
   d, judging whether the generated particle interferes with the model boundary, and if the interference occurs, deleting a portion of the particle outside the model boundary;
   e, calculating the volume of the particle model obtained in step d;
   f, repeating steps a-e, and summing the volumes of the obtained particle models to obtain $\Sigma V$; and
   g, judging whether $\Sigma V$ reaches $V_{(i-j)} \times \beta$, and if not, repeating steps a-f.

2. The modeling method according to claim 1, wherein the high-density discrete particle multiphase system is a particle reinforced composite material, a granular material in soft matter, a particle accumulation material or a short fiber reinforced composite material.

3. The modeling method according to claim 1, wherein in step (5), the method of expanding the compact model of each particle comprises the following steps:
   a, dividing the boundary of the modeling space in step (1) into finite element meshes, and assigning material properties to the finite element meshes;
   b, dividing the particles in step (4) into finite element meshes, and assigning material properties to the finite element meshes;
   c, defining a contact judgment mode between the particles and between the particles and the boundary of the modeling space, so that they do not penetrate each other; and
   d, applying a temperature or a heat flux load to the particles by finite element method to cause thermal expansion; after 1/a times thermal expansion, the sizes of the particles being changed from $i \times \alpha$-$j \times \alpha$ to i-j, and the volume sum of the particles also being expanded by $1 \times \beta$ times, from $V_{(i-j)} \times \beta$ to $V_{(i-j)}$.

4. The modeling method according to claim 3, wherein in step a, the model boundary is a temperature-independent rigid material;
   in step b, the particles are of a thermoelastic material or a thermoplastic material;
   in steps a-b, the particle models are divided into shell or solid elements, and the model boundary is of solid elements or shell elements; and
   in step c, the contact mode is surface-to-surface contact, or node-to-surface contact, or node-to-node contact.

5. The modeling method according to claim 1, wherein voids between the particles are used as a second phase, and a multiphase model is thus generated.

6. The modeling method according to claim 1, wherein in step (3), $\alpha=0.4$-$0.9$, and $\beta=\alpha^3$.

7. The modeling method according to claim 1, wherein in step (5), the method of expanding the compact model of each particle is a numerical method of discrete elements.

8. An application of the modeling method according to claim 1 in the modeling of a two-dimensional meso-structure, wherein the volume is replaced by area, a sphere generated at the random point is replaced by a circle, an inscribed polyhedron is replaced by an inscribed polygon of a circle, and $\beta=\alpha^2$.

9. An application of the modeling method according to claim 1 in the modeling of a fiber reinforced composite material, wherein a sphere generated at a random point is replaced by a column, and a fiber model is generated from the column.

* * * * *